Aug. 7, 1951     C. F. TEICHMANN     2,562,969
RADIATION DETECTION

Filed June 2, 1949     3 Sheets-Sheet 1

INVENTOR.
CHARLES F. TEICHMANN
BY *Daniel Stryker*

ATTORNEY

Aug. 7, 1951 C. F. TEICHMANN 2,562,969
RADIATION DETECTION
Filed June 2, 1949 3 Sheets-Sheet 2

INVENTOR.
CHARLES F. TEICHMANN
BY Daniel Stryker
ATTORNEY

Aug. 7, 1951     C. F. TEICHMANN     2,562,969
RADIATION DETECTION
Filed June 2, 1949     3 Sheets-Sheet 3
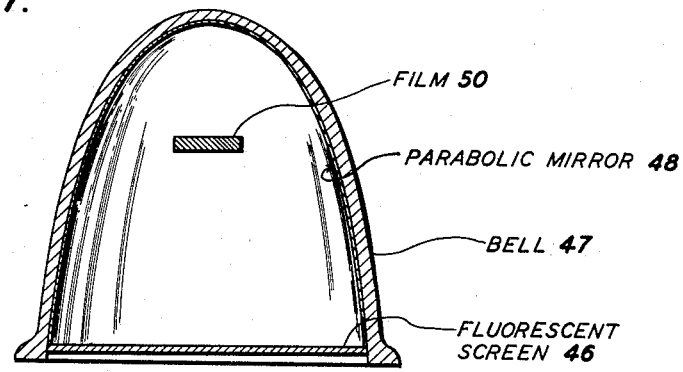
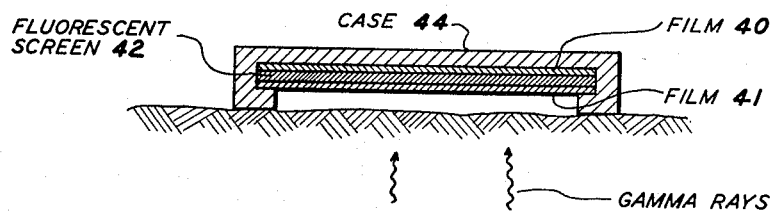
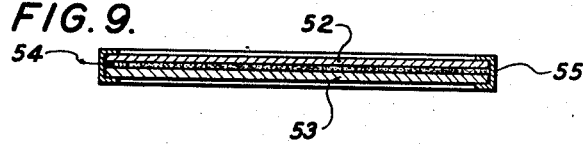
INVENTOR.
CHARLES F. TEICHMANN
BY
ATTORNEY Patented Aug. 7, 1951

2,562,969

UNITED STATES PATENT OFFICE 2,562,969

RADIATION DETECTION

Charles F. Teichmann, Crestwood, N. Y., assignor to Texaco Development Corporation, New York, N. Y., a corporation of Delaware Application June 2, 1949, Serial No. 96,680

7 Claims. (Cl. 250—71)

This invention relates to detection of gamma radiation and more particularly to the measurement of the intensity of gamma radiation, for example in geophysical exploration conducted with a view to locating ore bodies and the like.

As disclosed in co-pending application Serial No. 13,842, filed March 9, 1948, by Gerhard Herzog, variations in the intensity of gamma radiation emitted from different locations in an earth mass may be indicative of the location of a mineralized zone in the mass, even though the zone itself contains no radioactive material and even though it be so deeply buried that no significant amount of gamma radiation originating in the zone reaches the points at which the intensity of gamma radiation is measured.

Zinc and lead sulfide ore bodies occuring as replacements in dolomite and overlain by several hundred feet of overburden may be revealed by measuring gamma ray intensities at spaced points along a traverse overlying the ore body. Immediately over the ore body gamma ray intensities are at a minimum and intensities are higher in the barren zone around the body. In short, the presence of the ore body is revealed by a negative anomaly.

In other instances, of which certain disseminated copper deposits in porphyry may be taken as example, the presence of the deposit is revealed through increases in gamma ray intensity as the deposit is approached, thus giving rise to a positive anomaly.

As indicated above, in many instances the depth of overburden is so great that its shielding effect precludes the possibility that the detected gamma radiation originates in the ore body itself. Moreover, it has been discovered that the anomaly may be detected even after the ore body has been completely stoped out. These facts and other consideration give rise to the thought that what is really detected in such cases is a radioactive "aura" in the country rock around the ore body. If gamma ray intensity from the aura increases as the body is approached, there is a positive anomaly. If the intensity decreases, the anomaly is negative.

The locatinon of anomalies which are truly indicative of the presence of an ore body of the non-radioactive metals, such as lead, zinc, copper, gold, iron, etc., while entirely practicable, is complicated by the fact that the differences in gamma ray intensity which constitute the anomaly are very small and by the fact that the efficiency of most available apparatus for the detection of gamma rays is low. Thus, on the average, a conventional Geiger-Mueller counter consisting of a tubular cathode and a concentric wire anode will detect only one gamma ray out of each 200 which enter its active volume. In consequence, variations in background, for example, the gamma ray constituent of cosmic rays, or statistical variations in gamma ray emission from the earth, may obscure the significant differences in intensity of gamma radiation from point to point and produce a misleading anomaly or no anomaly at all. Errors in measurments of intensity may be compensated, at least in part, by increasing the time of observation at each point. But the requisite time in many cases may be a matter of days, so that with conventional apparatus such as Geiger-Mueller counters, the investment in equipment and the time and skilled labor required tend to eliminate gamma ray detection as a commercial prospecting procedure for the location of deposits of non-radioactive metals.

The foregoing difficulties are avoided in the practice of my invention by disposing photo-sensitive bodies respectively at a plurality of known locations in an earth zone to be investigated and exposing the bodies to the action of light produced from gamma rays emitted from earth at the respective locations. Thereafter the bodies are subjected to photographic developments, and the developed intensities of the bodies are compared. The term "light" is used throughout the following description and claims to refer to electro-magnetic radiation in either the visible spectrum or in the ultraviolet spectrum.

The invention provides inexpensive rugged detectors for gamma ray intensity. Preferably a plurality of these are employed simultaneously at a plurality of points, and for relatively long time periods.

Gamma rays cause certain materials to fluoresce, i. e. to release light, in the ultraviolet or visible spectrum, or both. My invention contemplates in a gamma ray detector for geophysical exploration and other uses, a fluorescent screen which produces a light under the action of gamma rays, and a photo-sensitive body disposed in the path of the light. In accordance with one embodiment of the invention, an optical system is included in the detector to concentrate the light emanating from the fluorescent screen onto the photosensitive body The optical system may employ reflectors or lenses or both.

In the preferred practice of my invention as applied to geophysical exploration, fluorescent screens are placed at a large number of observation points in an area to be explored. At each point, gamma rays from the earth impinge upon the screen and cause fluorescence. A light-sensitive body is associated with each screen and is exposed to the action of the resulting light. The exposures at the various locations are made substantially simultaneously and for the same length of time, which may range from several hours to several days or more, depending upon the range of gamma ray intensity involved. Thereafter, each light-sensitive body is subjected to photographic development, and the developed bodies are compared.

The several fluorescent screens and the light-sensitive bodies, say photographic films, should be identical, so as to eliminate additional variables tending to confuse the comparison. If the work is done properly, the relative darkening of the films gives a reliable comparison of gamma ray intensities at the several points investigated. The degree of darkening of the film may be measured with various apparatus, say a conventional light meter, densitometer or the like, and the resulting numerical results plotted on a map of the area being investigated. Points of equal intensities can then be joined by lines, known as "isoradins," and a study of these will reveal the existence of any anomalies present.

The method of the invention may be practiced with a variety of apparatus. Perhaps the simplest form comprises a light-proof case containing a photographic film and closed on one face by a screen or plate of material which releases photons upon excitation with gamma rays. A number of such pieces of equipment are placed at spaced locations in the area to be explored, with the screen facing the earth surface. Exposures are then made for equal lengths of time at each location, and thereafter the films are subjected to identical photographic development and compared.

Increased accuracy and economy of time or both may be obtained by concentrating the light produced in the fluorescent screen by means of reflectors or lenses or both. In my preferred practice this is done by employing a concave reflector, preferably a parabolic reflector. Light produced by the excitation of the fluorescent material with the gamma rays is concentrated by the reflector at a focal point. If desired, the light-sensitive body may be disposed at the focal point, or the light may be transmitted and even concentrated further by a lens to direct a beam of the light at a photographic film.

These and other aspects of the invention are explained in detail hereafter and illustrated by the accompanying drawings in which:

Fig. 7 is a vertical section of an embodiment similar to that of Fig. 6 wherein the lens of Fig. 6 has been replaced by a parabolic mirror;

Fig. 8 is a vertical section through a form of apparatus differing from that shown in Fig. 3 in the inclusion of photo-sensitive elements above and below the fluorescent screen; and Fig. 9 is a sectional elevation of one type of fluorescent screen found to be satisfactory in the practice of the invention.

Figure 1:
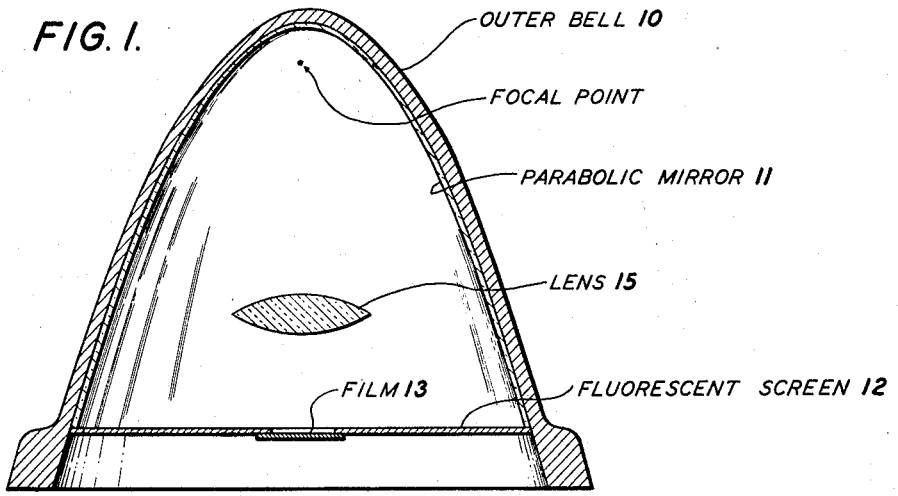
Fig. 1 is a vertical section through one form of the detector of the invention which employs a reflector in the form of a paraboloid to concentrate light resulting from excitation of a fluorescent screen by gamma rediation from the earth.

The apparatus of Fig. 1 comprises a bell or case 10 with an interior in the shape of a paraboloid. It is lined with a paraboloid mirror 11 or reflector, which may be a separate fitted element or applied directly as silvering on the interior of the bell. The bell itself may be of any convenient material, such as metal or plastic and is designed to be made cheaply and in quantity.

An annular fluorescent screen 12 extends across the mouth of the bell and is fastened rigidly to its rim. The aperture at the center of the screen opens into a cavity adapted to hold a photo-sensitive film 13.

A lens 15 is held within the paraboloid mirror between the focal point and the film and serves to direct reflected light from the mirror to the film. Any convenient mounting means such as a spider (not shown) may be employed to hold the lens in position.

In operation, the apparatus of Fig. 1 is disposed in a selected location on the ground in an area to be prospected. For example, a grid may be surveyed over the area and one of the bells placed at each grid intersection. Unexposed film is placed in the apparatus. Gamma rays from the earth strike the fluorescent screen and induce fluorescence, i. e. light is released from the upper surface of the screen into the bell.

The nature of the paraboloid reflecting surface is such as to gather the light emanating from the fluorescent screen at the lens 15 which in turn concentrates it on the film 13. The higher the intensity of the gamma radiation impinging on the screen, the greater is the light produced within the bell, and hence the greater the darkening of the photo-sensitive film.

The films in all the bells are exposed for substantially the same time period and as nearly simultaneously as practicable. It is desirable to expose the films at approximately the same time to eliminate extraneous variables such as cosmic showers. Then all are collected, developed under conditions as nearly identical as possible, and subjected to examination to determine the degree of darkening. This may be done with a comparator comprising a constant light source which is projected through the film to the sensitive element of a photo-cell, such as a light meter. Each film is thus rated for darkness and its rating plotted at a point on a map corresponding to that at which the exposure was made.

A great many materials, probably hundreds, fluoresce (i. e. phosphoresce or scintillate) under the influence of gamma radiation. Zinc sulphide and calcium tungstate are known inorganic phosphors, and anthracene is a known example of an organic compound in the same category. Other organic examples are:

| Material | Angstroms |
| --- | --- |
| o-Aminobenzoic Acid | Phosphoresces. |
| p-Aminophenol.HCl | 2950–3350. |
| Bensamidine/HCl | Phosphoresces. |
| Benzene-m-sodium Disulfonate | Do. |
| Benzoic Acid | 2950–5000. |
| o-Chlorobenzoic Acid | Phosphoresces. |
| Diphenyl | 3450–4500. |
| Diphenylamine | Phosphoresces. |
| Diphenyl Carbonate | Do. |
| Hydrobenzoin | Do. |
| p-Hydroxybenzoic Acid | Do. |
| Naphthalene | 3300–4500 (Peak 3460). |
| Naphthalene Calcium Disulfonate | 3700–4500. |
| Naphthionic Acid, Sodium Salt | 4100–4700. |
| 1-Naphthylamine-3, 7-disulfonic Acid Sodium Salt. | 3950–6000. |
| Theobromine | Phosphoresces. |

As indicated above, hundreds of compounds will phosphoresce under gamma radiation with the production of light in the visible spectrum or of longer wave length as in the ultraviolet range or both. In general, it appears that aromatic nuclei, probably optimum in the form of condensed polynuclear compounds, tend to make their compounds capable of phosphorescence under gamma radiation.

The phosphorescent screen employed in the apparatus of Fig. 1 and those to be described later may utilize any organic or inorganic compound which fluoresces.

Gamma rays have relatively high penetrative properties and lose little energy in passing through a thin screen. The greater the absorption of the gamma rays, i. e. the greater the energy loss, the more secondary light is produced in a phosphorescent screen. Absorption can be increased by increasing screen thickness, but this reduces the transmission of the secondary light (either visible or ultraviolet) out of the screen. Screen thickness then becomes a matter of compromise, but there is an optimum thickness for any particular material. Those which afford high transmission for the secondary light are preferred because they permit increase in the efficiency of gamma ray absorption and still permit the secondary light to escape through the screen for action upon the photo-sensitive body in accordance with the invention.

Most photographic emulsions are very sensitive to ultraviolet light. Consequently, as indicated above, it is not necessary that the phosphorescent screen produce light in the visible spectrum for the practice of the invention. Ultraviolet fluorescence is useful, especially in the case of a screen which has a high transparency or transmission for ultraviolet. Such a screen can be relatively thick, so as to increase gamma ray absorption without reducing the registered light intensity within the instrument.

The total number of photons of fluorescence yielded per gamma photon which excites fluorescence is, on the average, a very large number. It can be of the order of $10^5$. An outline of the mechanism by which it is believed that the phosphorescence or scintillation is produced will show why such high numbers apply.

1. One gamma photon, of energy 1 M. E. V., wave length $1.2 \times 10^{-2}$ Å., enters phosphor.
2. Chief process of energy transfer to the phosphor is Compton scattering from the outer electrons. Single scattering is assumed; therefore the scattered photon traverses the phosphor without further energy loss. The recoil electron, however, is brought to rest and thus gives most of its energy up to the phosphor as ionization and excitation.
3. Excited molecules of the phosphor emit this energy as N photons of fluorescence, with various energies, averaging say, 3 E. V. wave length 4000 Å.

Note.—If all the 1 M. E. V. photon energy has been converted into the N fluorescent photons the yield would have been $$N/1 = \frac{10^6 \text{ e. v.}}{3 \text{ e. v.}} = 3 \times 10^5$$

Not all of the photons of fluorescence that are produced may have the right wave length to excite the particular photo-sensitive element employed for detection and some will be absorbed in transmission out of the screen to the photo-sensitive element. But even after taking account of these factors and even of poor geometry, the photon yield induced by gamma radiation is large.

Most photographic emulsions have an initial inertia against exposure, but this may be overcome by a sensitizing process employing for example, mercury or preliminary exposure to light. The photosensitive film or other body employed as detector in the practice of my invention may be pre-sensitized. Films of adequate sensitivity are available commercially, having been developed for use in various types of spectroscopy.

Figure 2:
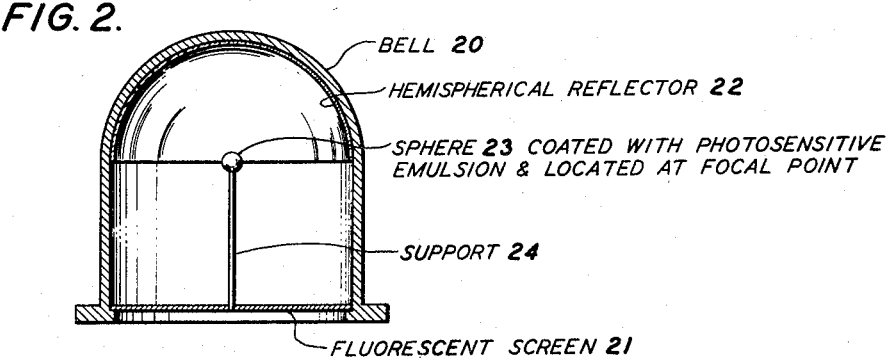
Fig. 2 is a vertical section of an alternate form of apparatus employing a hemispherical reflector to concentrate the light at a focal point where the photo-sensitive body in spherical form is disposed.

Another type of the apparatus of my invention is shown in Fig. 2. It has a bell 20 with an upper hemispherical portion formed integrally with a lower cylindrical portion. The latter is closed by a transverse disc 21 of material which phosphoresces under the action of gamma radiation. A hemispherical reflector 22 is fitted into the upper portion of the bell and a sphere 23 coated with photo-sensitive emulsion is located within the bell at the focal point of the reflector, being held in this position by a concentric vertical post 24 or support, upon which it rests.

The apparatus of Fig. 2 is used in geophysical exploration or prospecting in the same way as that described for the apparatus of Fig. 1. After exposure the exposed spheres are subjected to development and comparison as to darkening. Comparison may be facilitated by employing hollow spheres of thin glass or the like. A small light transmitted through the coating is measured with conventional light metering equipment.

The mechanisms of Figs. 1 and 2 have the advantage that they concentrate light and hence increase the intensity of the light used to expose the photo-sensitive element. In some cases, however, this concentration of light may be eliminated. If the gamma radiation to be measured is relatively intense, if the fluorescent screen is particularly efficient in producing secondary light as a result of gamma ray excitation, or if a particularly sensitive film is employed as a detector, the simple apparatus of Fig. 3 may be employed. It consists of a flat case or film holder 30 with a fluorescent screen 31 susceptible to activation by gamma rays as its bottom. The case and screen enclose a photo-sensitive film 32 which lies on the screen. Gamma rays from an earth mass on which the case is placed produce photons in abundance in the screen, and some of these are directed to and affect the film.

Figure 3:
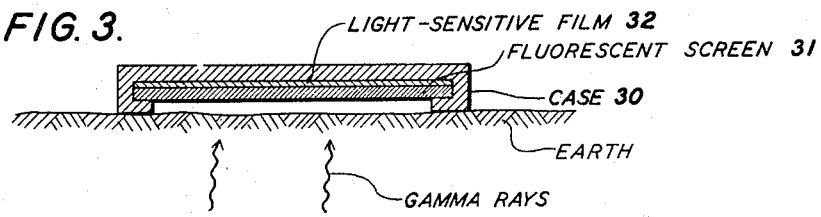
Fig. 3 is a vertical section through a third form of apparatus which is usable in the practice of the invention in cases of relatively high gamma ray intensity, but which does not employ reflectors or lenses to concentrate the light prior to its contact with the photo-sensitive body.

The apparatus of Fig. 8 is similar to that of Fig. 3 in that there is no optical system for concentrating the radiation from the screen. In the embodiment of Fig. 8, two photo-sensitive films 40, 41 are employed with one of the films being disposed on either side of a fluorescent screen 42. As in Fig. 3, the films and screen are mounted in a case 44. In use, the two films are exposed and developed as described above. The developed films are placed together and the blackening of both films is measured simultaneously. Hence the apparatus of Fig. 8 has twice the efficiency for the measurement of fluorescent light as compared to the apparatus of Fig. 3.

Figure 6:
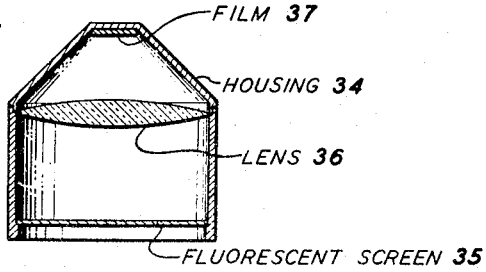
Fig. 6 is a vertical section through another form of apparatus employing a lens to concentrate the light on the photo-sensitive body.

The apparatus of Fig. 6 represents another means of concentrating light emanating from a phosphorescent screen onto a photo-sensitive body. This embodiment comprises a housing 34 which may be cylindrical in part and conical in part. A fluorescent screen 35 is disposed across the base of the housing and condensing lens 36 is mounted above the screen within the cylindrical section of the housing. A photo-sensitive film 37 is disposed in the housing at or adjacent the focal point of the lens 36. This apparatus is used in prospecting in the manner heretofore described.

The total amount of light emitted by a fluorescent screen is proportional to its area, the intensity per unit area being independent of the size of the screen. It is the object of the optical arrangements shown in Figs. 1, 2, 6 and 7 to concentrate the light emitted from the comparatively large screen to a small area at which point the photographic film is placed. The optical system thereby increases the light intensity at the location of the photographic film. It is preferable to concentrate this light on a predetermined area of the photo-sensitive element rather than at a point thereon. The image of a point source of light is difficult if not impossible to compare with a similar image whereas if a given area of the film is exposed it is readily compared with a like exposed area of another film.

In the apparatus of Fig. 6 therefore, it is desired to get a reduction in the size of the image of the fluorescent screen without reducing the image to a point. To obtain this reduction, lens 36 is spaced closer to film 37 than to screen 35.

A modification of the apparatus of Fig. 6 is shown in sectional elevation in Fig. 7. In the apparatus of Fig. 7 a fluorescent screen 46 is mounted across the open end of a housing 47. The interior of the housing is parabolic and has a mirrored surface 48. A photosensitive element 50 is disposed within the housing and is positioned therein so that the parabolic mirror concentrates the image of the screen on the element 50. In this embodiment, the parabolic mirror accomplishes the function of lens 36 in the apparatus of Fig. 6.

Substantially any type of fluorescent screen may be employed provided only that it responds to gamma radiation by the production of light of either the visible or ultraviolet spectrum or both. One satisfactory arrangement is shown in sectional elevation in Fig. 9 and comprises opposing plates 52, 53 of transparent or ultraviolet permeable plastic between which is disposed a film 54 of phosphorescent material. Lucite is one type of plastic that may be employed. The plates 52, 53 may be held together as a unit in a number of ways, as for example, by an annular clip 55, shown in the drawing.

Figure 4:
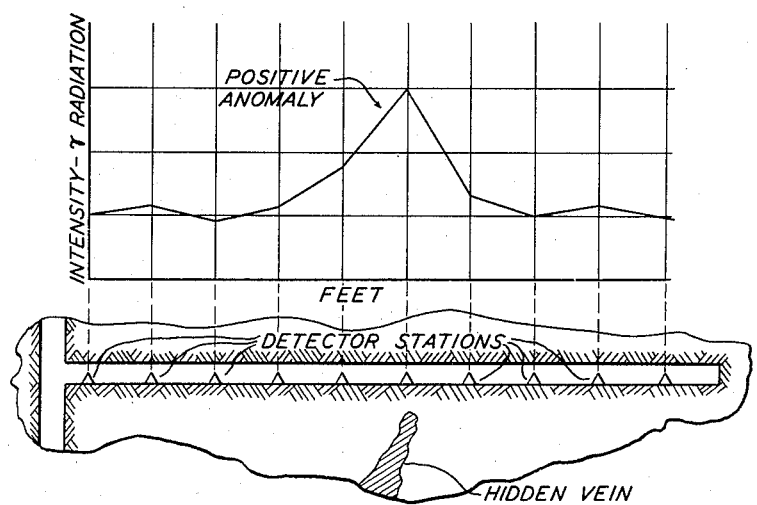
Fig. 4 is a diagram in vertical plane illustrating the application of the invention in an underground survey.

Fig. 4 illustrates the application of the invention to underground prospecting. A survey is conducted by placing a plurality of detectors, such as those of Fig. 1, respectively at detector stations spaced at intervals, say 50 feet, along a drift shown in vertical section. The films in the detectors are exposed substantially simultaneously for the same time, say 6 hours, and then removed, developed and rated, as already described. The ratings in terms of gamma ray intensity, or any other convenient units, say lumens, are plotted on the graph shown above the section against the position at which the rating was obtained. The plotted ratings are connected as shown. The peak on the graph represents a positive anomaly indicative of a hidden vein which the drift approaches but does not intersect.

Figure 5:
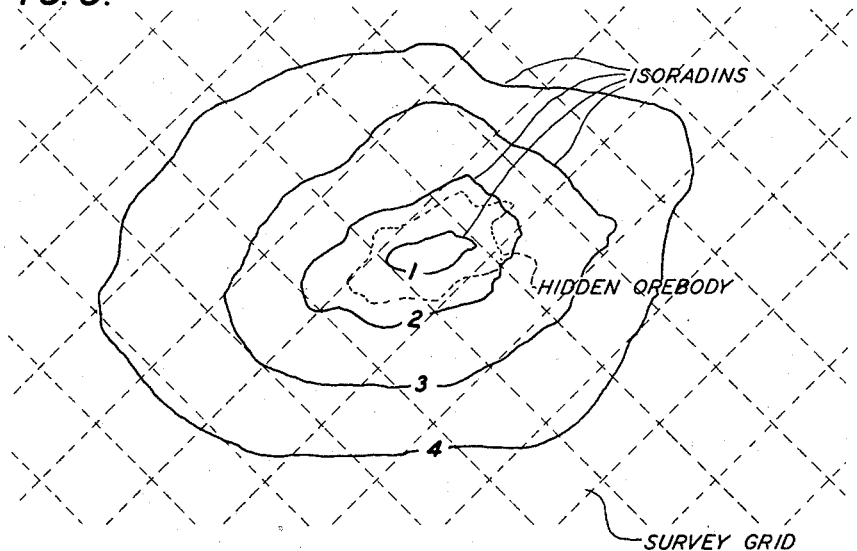
Fig. 5 is a map illustrating the application of the invention in a surface survey over an area below which the presence of an ore deposit is suspected.

Fig. 5 illustrates the application of the invention in a surface survey in a district known to contain flat-lying replacement bodies of lead and zinc sulphide in dolomite. One such hidden body is shown in dotted plan. A rectangular grid has been surveyed over the area, and readings taken simultaneously at the grid intersections with the instruments of Figs. 1, 2, 6 or 7. The films in the several instruments are exposed for equal times, collected, developed and rated. The ratings are plotted at the corresponding intersections and then points of equal rating are joined by "contours" or "isoradins." The isoradins are closed loops, one around another, with rating increasing from 1 to 4 as the distance from the ore body increases. This, then, is representative of a negative anomaly which reveals the approximate location of the ore body through several hundred feet of barren dolomite.

The use of the apparatus of the invention, including its optical system for the concentration of light produced from gamma radiation at the photo-sensitive body, is not limited to the prospecting procedures described above or for that matter to any prospecting procedure. Thus the apparatus may be used to measure the intensity of gamma radiation from hand samples taken in prospecting and to compare the intensities from different samples. It is, therefore, a versatile prospecting tool, and may also be used as a detector of gamma radiation from other sources, such as artificial radioactive isotopes employed in medical diagnosis and research.

One of the great virtues of the apparatus of the invention is its ruggedness. It has no vacuum tubes or moving parts and is suited to the rough handling which is almost inherent to mineral exploration, particularly in underground operations. The relatively long time required to make a reading does not preclude its use, for the equipment cost is so low that a great number of units may be employed simultaneously, so that the total time for a survey may be no greater than that consumed when using other more complicated and costly radiation detectors. Maintenance cost of the equipment is low and no great skill is required for field use, hence labor problems are minimized.

I claim:

1. In geophysical exploration, the improvement which comprises disposing light-sensitive bodies respectively at a plurality of horizontally spaced locations in an earth zone to be investigated, causing gamma rays emitted from the earth at each of the locations to produce light by impingement upon a relatively large area of fluorescent material, concentrating the light at each location onto a small area on the light sensitive body, exposing the bodies to the action of the concentrated light produced at the respective locations, subjecting the bodies to photographic development, and comparing the developed intensities of the bodies.

2. In geophysical exploration, the improvement which comprises disposing light-sensitive bodies respectively at a plurality of horizontally spaced locations in an earth zone to be investigated, causing gamma rays emitted from the earth at each of the locations to produce photons by impingement upon a relatively large area of fluorescent material, concentrating the photons by reflection at each location onto a small area on the light sensitive body, exposing the bodies to the action of the concentrated photons produced at the respective locations, subjecting the bodies to photographic development, and comparing the developed intensities of the bodies.

3. In a geophysical exploration, the improvement which comprises disposing light-sensitive bodies respectively at a plurality of horizontally spaced locations in an earth zone to be investigated, causing gamma rays emitted from the earth at each of the locations to produce photons by impingement upon a relatively large area of fluorescent material, concentrating the photons at each location by lens action onto a small area on the light sensitive body, exposing the bodies to the action of the concentrated photons produced at the respective locations, subjecting the bodies to photographic development, and comparing the developed intensities of the bodies.

4. In a gamma ray detector for geophysical examination of the earth, the combination which comprises a portable housing, a fluorescent screen which produces light under the influence of gamma radiation mounted on the housing and emitting light thus produced into the housing, a concave mirror disposed in the housing, the spatial relationship of the screen and the mirror being such that the mirror concentrates the light emitted into the housing, and a removable photosensitive film disposed in the housing in the path of the concentrated light from the mirror, the housing being proof against the admission of light other than that emitted from the screen.

5. In a gamma ray detector for geophysical examination of the earth, the combination which comprises a portable housing, a fluorescent screen which produces light under the influence of gamma radiation mounted on the housing and emitting light thus produced into the housing, a concave paraboloid mirror disposed in the housing, the spatial relationship of the screen and the mirror being such that the mirror concentrates the light emitted into the housing, and a removable photosensitive film disposed in the housing in the path of the concentrated light from the mirror, the housing being proof against the admission of light other than that emitted from the screen.

6. In a gamma ray detector for geophysical examination of the earth, the combination which comprises a portable housing, a fluorescent screen which produces light under the influence of gamma radiation mounted on the housing and emitting light thus produced into the housing, a concave mirror disposed in the housing, the screen being relatively large with respect to the housing and the spatial relationship of the screen and the mirror being such that the mirror concentrates the light emitted into the housing, and a removable photosensitive film disposed in the housing in the path of the concentrated light from the mirror, the housing being proof against the admission of light other than that emitted from the screen.

7. In a gamma ray detector for geophysical examination of the earth, the combination which comprises a portable housing, a fluorescent screen which produces light under the influence of gamma radiation mounted on the housing and emitting light thus produced into the housing, a concave mirror disposed in the housing, the spatial relationship of the screen and the mirror being such that the mirror concentrates the light emitted into the housing, a removable photosensitive film disposed in the housing in the path of the concentrated light from the mirror, and a lens disposed in the path of the light from the mirror to the film and capable of further concentrating the light passing to the film, the housing being proof against the admission of light other than that emitted from the screen.

CHARLES F. TEICHMANN.

REFERENCES CITED

The following references are of record in the file of this patent:

UNITED STATES PATENTS

| Number | Name | Date |
|---|---|---|
| 2,248,976 | Files | July 15, 1941 |
| 2,279,023 | Kallmann | Apr. 7, 1942 |
| 2,344,043 | Kallmann et al. | Mar. 14, 1944 |
| 2,409,436 | Krasnow et al. | Oct. 15, 1946 |
| 2,419,478 | Bouwers | Apr. 22, 1947 |

OTHER REFERENCES

Geophysical Exploration by C. A. Heiland, Prentice Hall Inc., N. Y., 1946, pages 35 and 879. Copy in Div. 54.